(12) United States Patent
Wang

(10) Patent No.: US 11,381,861 B2
(45) Date of Patent: Jul. 5, 2022

(54) METHOD AND DEVICE FOR PUSHING A BARRAGE, AND ELECTRONIC DEVICE

(71) Applicant: BOE TECHNOLOGY GROUP CO., LTD., Beijing (CN)

(72) Inventor: Xiang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 120 days.

(21) Appl. No.: 16/218,176

(22) Filed: Dec. 12, 2018

(65) Prior Publication Data

US 2019/0320217 A1 Oct. 17, 2019

(30) Foreign Application Priority Data

Apr. 17, 2018 (CN) .......................... 201810344228.0

(51) Int. Cl.
*H04N 21/258* (2011.01)
*H04N 21/239* (2011.01)
*H04N 21/431* (2011.01)
*H04N 21/4788* (2011.01)
*H04N 21/262* (2011.01)
*H04N 21/488* (2011.01)

(52) U.S. Cl.
CPC ..... *H04N 21/25891* (2013.01); *H04N 21/239* (2013.01); *H04N 21/26208* (2013.01); *H04N 21/4316* (2013.01); *H04N 21/4788* (2013.01); *H04N 21/4882* (2013.01)

(58) Field of Classification Search
CPC ........... H04N 21/25891; H04N 21/239; H04N 21/26208; H04N 21/4316; H04N 21/4788; H04N 21/4882; H04N 21/251; H04N 21/235; H04N 21/25866; H04N 21/435; H04N 21/4532; H04N 21/4668
See application file for complete search history.

(56) References Cited

U.S. PATENT DOCUMENTS

| | | | |
|---|---|---|---|
| 2005/0060741 A1* | 3/2005 | Tsutsui | H04N 21/4722 725/32 |
| 2012/0163770 A1* | 6/2012 | Kaiser | H04N 21/44016 386/241 |
| 2014/0089800 A1* | 3/2014 | Kao | G11B 27/00 715/719 |

(Continued)

FOREIGN PATENT DOCUMENTS

| CN | 105187933 A | 12/2015 |
|---|---|---|
| CN | 106101848 A | 11/2016 |

(Continued)

OTHER PUBLICATIONS

Chinese Office Action dated May 18, 2020, from application No. 201810344228.0.

*Primary Examiner* — Nathan J Flynn
*Assistant Examiner* — Christine A Kurien
(74) *Attorney, Agent, or Firm* — Arch & Lake LLP

(57) ABSTRACT

A method for pushing a barrage includes: clustering a plurality of historical barrages in a target database to obtain barrages to be displayed; determining an interested vector based on evaluation records of the historical barrages; determining a similarity between a vector of each of the barrages to be displayed and the interested vector; and pushing the barrage to be displayed to the user based on a determined similarity.

14 Claims, 3 Drawing Sheets

(56) References Cited

U.S. PATENT DOCUMENTS

| | | | |
|---|---|---|---|
| 2017/0032270 A1* | 2/2017 | Lee | G06N 7/005 |
| 2017/0150213 A1* | 5/2017 | Cremer | H04N 21/4314 |
| 2017/0249384 A1 | 8/2017 | Kandylas et al. | |
| 2017/0272800 A1* | 9/2017 | Wang | H04N 21/4888 |
| 2018/0189570 A1* | 7/2018 | Paluri | G06K 9/623 |

FOREIGN PATENT DOCUMENTS

| | | |
|---|---|---|
| CN | 106844653 A | 6/2017 |
| CN | 106921891 A | 7/2017 |
| CN | 107332905 A | 11/2017 |
| CN | 107463643 A | 12/2017 |
| CN | 107509116 A | 12/2017 |

* cited by examiner

METHOD AND DEVICE FOR PUSHING A BARRAGE, AND ELECTRONIC DEVICE

CROSS-REFERENCE TO RELATED APPLICATIONS

The present application claims priority to Chinese Patent Application No. 201810344228.0 filed Apr. 17, 2018, the entire contents of which are incorporated herein by reference.

TECHNICAL FIELD

The present disclosure relates to the field of computer technology, and in particular, to a method and device for pushing a barrage, and an electronic device.

BACKGROUND

With the development of Internet technology, the application of the barrage technology in the field of video playback is also increasing. A barrage refers to a variety of comments, when a user watches the video, provided by other users and slowly scroll past the video screen.

In the current barrage technical solution, all of the users' comments are displayed on the play interface. As the number of comments increases, more and more barrages appear at the same time, which will affect the user's normal viewing of the video. Moreover, most of the barrages displayed in this way are necroposting and are not really of interested to the user.

Therefore, how to push interested barrages to the user and realize the personalized barrage recommendation has become a technical problem to be solved.

It should be noted that the foregoing information disclosed in Background are only for the purpose of enhancement of the understanding of the background of the present disclosure and therefore the information can include information that does not constitute the prior art already known to those of ordinary skill in the art.

SUMMARY

According to an aspect of the present disclosure, there is provided a method for pushing a barrage. The method includes clustering a plurality of historical barrages in a target database to obtain barrages to be displayed. The method includes determining an interested vector based on evaluation records of the historical barrages. The method includes determining a first similarity between a vector of the barrage to be displayed and the interested vector. The method includes pushing the barrage to be displayed to the user based on the first determined similarity.

In some exemplary arrangements of the present disclosure, clustering a plurality of historical barrages in a target database further includes obtaining the plurality of historical barrages in the target database, classifying the plurality of historical barrages according to a video to which the historical barrages belong and time periods that the historical barrages are respectively located in the video, and clustering the classified historical barrages in each of the time periods to obtain a plurality of clusters.

In some exemplary arrangements of the present disclosure, obtaining a barrage to be displayed includes determining a second similarity between each the historical barrage in each of the clusters and a barrage with a vector in a center point of the cluster, and obtaining the barrage to be displayed based on the second determined similarity.

In some exemplary arrangements of the present disclosure, obtaining the barrage to be displayed based on the determined similarity includes multiplying the first determined similarity of the barrage by an evaluation number of a corresponding historical barrage to obtain a score of the corresponding historical barrage; and obtaining the barrage to be displayed based on the score of the corresponding historical barrage in the cluster.

In some exemplary arrangements of the present disclosure, obtaining the barrage to be displayed based on a score of each of the corresponding historical barrage in the cluster includes taking a historical barrage with highest score in each of the clusters as the barrage to be displayed in the cluster.

In some exemplary arrangements of the present disclosure, the method for pushing a barrage further includes taking a sum of evaluation numbers of all the historical barrages in the cluster in which the barrage to be displayed is located as the evaluation number of the barrage to be displayed.

In some exemplary arrangements of the present disclosure, pushing the barrage to be displayed to the user based on a determined similarity includes multiplying the evaluation numbers of the barrages to be displayed of the clusters by the determined similarity to obtain scores of the barrages to be displayed of the clusters. Such an operation further includes sorting the barrages to be displayed of the various clusters based on the scores of the barrage to be displayed, and pushing the barrages to be displayed of the clusters based on a sorted order.

In some exemplary arrangements of the present disclosure, the method for pushing a barrage further includes segmenting the plurality of historical barrages in the target database to obtain a word vector of each of the historical barrages, and adding and averaging the word vector of each of the historical barrages to obtain a vector of each of the historical barrages.

In some exemplary arrangements of the present disclosure, segmenting the plurality of historical barrages in the target database to obtain a word vector of each of the historical barrages includes using word2vec to segment the plurality of historical barrages in the target database to obtain the word vector of each of the historical barrages.

In some exemplary arrangements of the present disclosure, determining an interested vector based on evaluation records of the historical barrages includes adding and averaging the word vector of each of the historical barrages to obtain an interested vector.

According to another aspect of the present disclosure, there is provided a device for pushing a barrage. The device includes a clustering unit configured to cluster a plurality of historical barrages in a target database to obtain barrages to be displayed. The device includes an interested vector determining unit configured to determine an interested vector based on evaluation records of the historical barrages. The device includes a similarity determining unit configured to determine a similarity between a vector of each of the barrages to be displayed and the interested vector. The device includes a pushing unit configured to push the barrage to be displayed to the user based on a determined similarity.

According to another aspect of the present disclosure, there is provided an electronic device. The electronic device includes a processor and a memory storing computer readable instructions. The computer readable instructions are executed by the processor to implement the above described method for pushing a barrage.

According to another aspect of the present disclosure, there is provided a computer readable storage medium storing computer programs. The computer programs are executed by a processor to implement the barrage pushing method as described above.

It shall be understood that the above general description and the following detailed description are merely exemplary and explanatory and are not intended to be restrictive of the present disclosure.

BRIEF DESCRIPTION OF THE DRAWINGS

The accompanying drawings, which are incorporated in and constitute a part of this specification, illustrate arrangements consistent with the present disclosure and, together with the description, serve to explain the principles of the present disclosure. It will be obvious that the drawings in the following descriptions are some arrangements of the present disclosure only, and those ordinary skilled in the art may obtain other drawings form these drawings without paying any creative labor. In the drawings.

DETAILED DESCRIPTION

Figure 1:
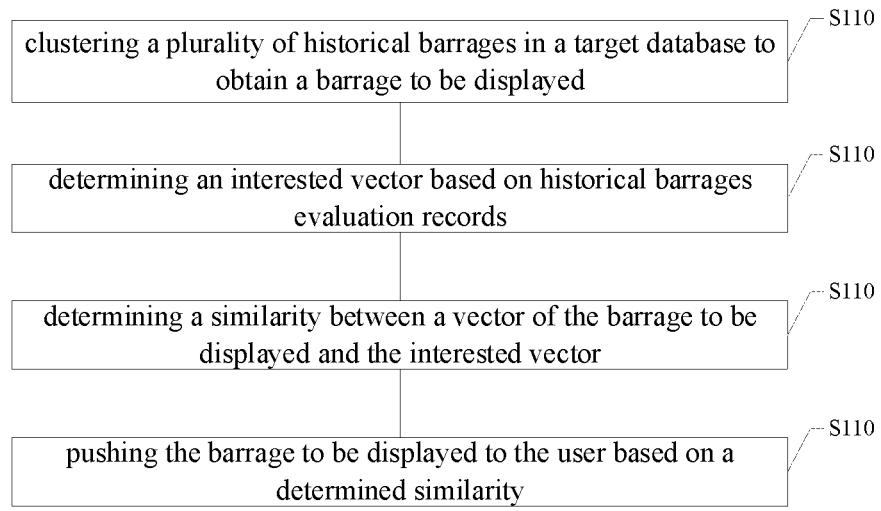
FIG. 1 is a flowchart showing a method for pushing a barrage according to some arrangements of the present disclosure.

The exemplary arrangements will now be described more fully with reference to the accompanying drawings. However, the exemplary arrangements can be implemented in various forms and should not be understood as being limited to the examples set forth herein; rather, these arrangements are provided so that this disclosure will be thorough and complete, and the conception of exemplary arrangements will be fully conveyed to those skilled in the art. In the drawings, the same reference numerals will be used to designate same or similar elements, a repetitive description thereof will therefore be omitted.

The features, structures or characteristics described herein may be combined in one or more arrangements in any suitable manner. In the following description, numerous specific details are provided so as to allow a full understanding of the arrangements of the present disclosure. However, those skilled in the art will recognize that the technical solutions of the present disclosure may be practiced without one or more of the specific details, or other methods, components, devices, steps and so on may be used. In other cases, the well-known technical solutions are not shown or described in detail to avoid obscuring various aspects of the present disclosure.

Some of the block diagrams shown in the figures are functional entities and do not necessarily have to correspond to physically or logically independent entities. These functional entities may be implemented in software, or implemented in one or more hardware modules or integrated circuits, or implemented in different network and/or processor devices and/or microcontroller devices.

The flowcharts shown in the figures are merely illustrative, and not all of the contents and operations/blocks are necessarily included, and are not necessarily performed in the order described. For example, some operations/blocks may be decomposed, and some operations/blocks may be combined or partially merged, so the actual execution order may vary depending on the actual situation.

FIG. 1 is a flowchart showing a method for pushing a barrage according to some arrangements of the present disclosure. Referring to FIG. 1, the method for pushing a barrage includes the following blocks.

In block S110, a plurality of historical barrages in a target database are clustered to obtain barrages to be displayed.

In block S120, an interested vector is determined based on evaluation records of the historical barrages.

In block S130, a similarity between a vector of each of the barrages to be displayed and the interested vector is determined.

In block S140, the barrage to be displayed is pushed to the user based on a determined similarity.

According to a method for pushing a barrage showed in FIG. 1, on one hand, a plurality of historical barrages in a target database are clustered to obtain barrages to be displayed, in this way that the same or similar barrages can be aggregated into the same cluster, which reduces the barrages having duplicate content. On the other hand, an interested vector is determined based on evaluation records of the historical barrages, a similarity between a vector of each of the barrages to be displayed and the interested vector is determined, in this way that interested barrages can be pushed to the user and a personalized barrage recommendation can be realized, thus viewing experience of the user can be improved.

Next, the method for pushing a barrage in the exemplary arrangement showed in FIG. 1 will be described in detail.

In the block S110, a plurality of historical barrages in a target database are clustered to obtain barrages to be displayed.

In the exemplary arrangement showed in FIG. 1, the target database can be a database deployed on a server of the video playing website, which stores historical barrages information input by the user while watching the video.

In some exemplary arrangements, a clustering operation is performed to cluster the plurality of historical barrages information in the target database, and the historical barrage which is close to the center of the cluster is used as the barrage to be displayed to the user, that is the barrage to be recommended to the user. The clustering operation may include a K-means clustering operation or a K-neutral point clustering operation, but the arrangement of the present disclosure is not limited thereto. For example, the clustering operation may also be a hierarchical clustering operation or a density-based clustering operation, which is within the scope of protection of the present disclosure.

In the block S120, an interested vector is determined based on evaluation records of the historical barrages.

In some exemplary arrangements, the user's historical barrage evaluation records are also stored in the target database, and the historical barrage evaluation records can be evaluation records of the user about the historical barrage of the video played in a past period of time, for example, 6 months or 12 months. The evaluation records include, for example, praise records or comment records, and other forms of evaluation records such as favorite records.

In some exemplary arrangements, the user's historical barrage evaluation records are associated with the corresponding historical barrages, and the user's interested vector can be determined based on the vector of the historical barrages corresponding to the historical barrage evaluation records. For example, in the historical barrage evaluation records, there are the user's praises or comments on a historical barrage, and the vector of the historical barrage can be used to obtain the user's interested vector.

In the block S130, a similarity between a vector of each of the barrages to be displayed and the interested vector is determined.

In some exemplary arrangements, the corresponding similarity may be determined based on the distance between the vector of the barrage to be displayed and the user's interested vector. The distance between the vector of the barrage to be displayed and the user's interested vector may be Hamming distance, Euclidean distance, and cosine distance. However, the distance in the exemplary arrangement of the present disclosure is not limited thereto, and for example, the distance may be a Mahalanobis distance, a Manhattan distance, or the like.

In the block S140, the barrage to be displayed is pushed to the user based on a determined similarity In some exemplary arrangements, the barrage to be displayed may be pushed to the user based on the distance between the vector of the barrage to be displayed and the user's interested vector. For example, the barrages to be displayed may be sorted according to the distance between the vector of the barrage to be displayed and the user's interested vector, and the barrages to be displayed are pushed to the user based on the sorting result.

In some exemplary arrangements of the present disclosure, the plurality of historical barrages in the target database are segmented to obtain a word vector of each of the historical barrages; and the word vectors of the historical barrages are added and averaged to obtain a vector of each of the historical barrages. For example, the plurality of historical barrages in the target database are segmented by means of word2vec to obtain a word vector of each of the historical barrages; and the word vectors of the historical barrages are added and averaged to obtain a vector of the barrages.

Figure 2:
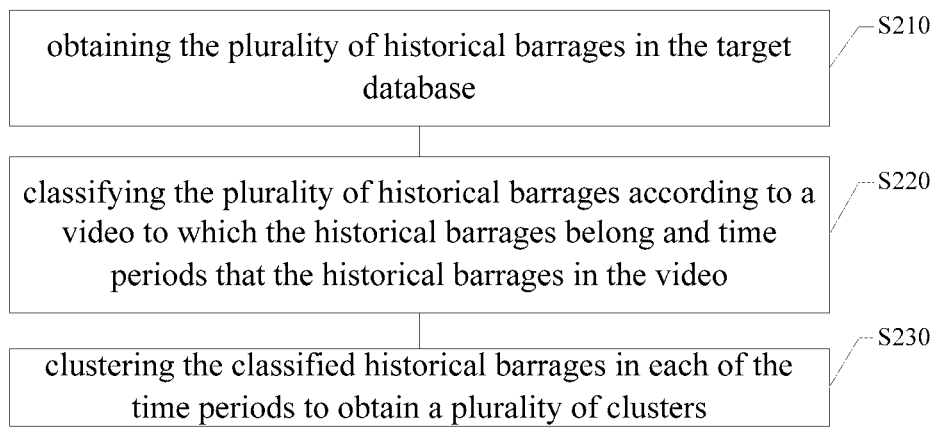
FIG. 2 is a flowchart showing clustering of historical barrages according to some arrangements of the present disclosure.

FIG. 2 is a flowchart showing clustering of historical barrages according to some arrangements of the present disclosure.

Referring to FIG. 2, in block S210, a plurality of historical barrages in a target database are obtained. A plurality of pieces of historical barrage information corresponding to a plurality of videos are stored in the target database. The target database can be deployed on a server of a video playing website having a barrage function.

In block S220, the plurality of historical barrages are classified according to a video to which the historical barrages belong and time periods that the historical barrages being in the video.

In some exemplary arrangements, the plurality of historical barrages may be classified according to a video to which the historical barrages belong and time periods that the historical barrages being in the video. For example, the video can be divided into multiple sub-time periods, and the historical barrages in each sub-time period are put into a group.

In the block S220, the historical barrages in each of the time periods are clustered to obtain a plurality of clusters.

In some exemplary arrangements, the historical barrages in each of the time periods are clustered by clustering operation, to obtain a plurality of clusters. The clustering operation may include a K-means clustering operation or a K-neutral point clustering operation. The clustering operation may also be a hierarchical clustering operation or a density-based clustering operation. Clustering the historical barrages of each time period can reduce the barrages with the same or similar content in the same time period, so that viewing experience of the user can be improved.

In some exemplary arrangements, for each of the clusters, similarity between each of the historical barrages and a barrage with a vector in a center point of the cluster can be determined. For example, distance between each of the historical barrages and a barrage with a vector in a center point of the cluster can be calculated, and the similarity between each of the historical barrages and a barrage with a vector in a center point of the cluster can be determined based on the calculated distance. Next, the barrages to be displayed can be obtained based on the determined similarity, that is, the historical barrages close to the vector in the center point of the cluster is used as the barrage to be displayed to the user.

In some exemplary arrangements, the evaluation number of each of the historical barrages in the cluster, such as praise records number or comment records number, can be obtained. The evaluation number of each of the historical barrages in the cluster is multiplied by the determined similarity to obtain the score of each of the historical barrages in the cluster. The barrage to be displayed can be obtained based on the score of each of the historical barrages in the cluster. For example, a historical barrage with highest score in each of the clusters can be taken as the barrage to be displayed in the cluster.

In some exemplary arrangements, a sum of evaluation numbers of all the historical barrages in the cluster in which the barrage to be displayed is located can be taken as the evaluation number of the barrage to be displayed. The evaluation number of the barrage to be displayed is multiplied by the above described similarity between a vector of the barrages to be displayed and the interested vector to obtain the score of the barrage to be displayed, and on the base of the score, the barrage to be displayed is pushed to the user.

Figure 3:
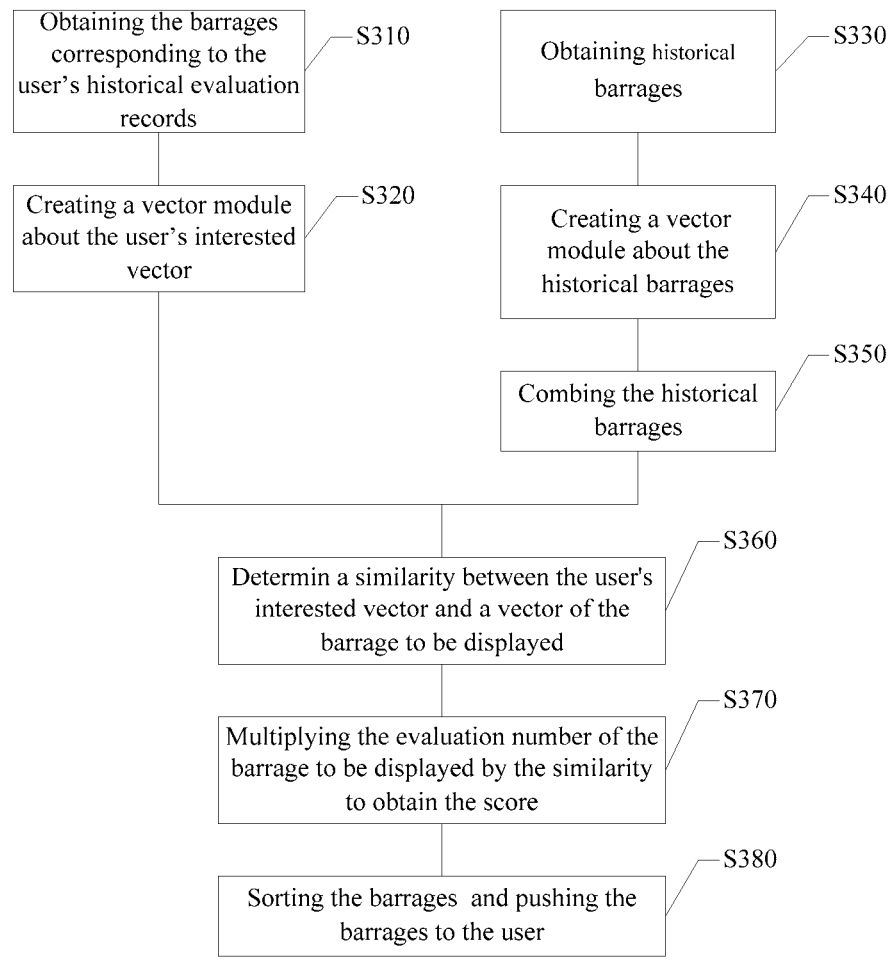
FIG. 3 is a flowchart showing a method for pushing a barrage according to some arrangements of the present disclosure.
Figure 4:
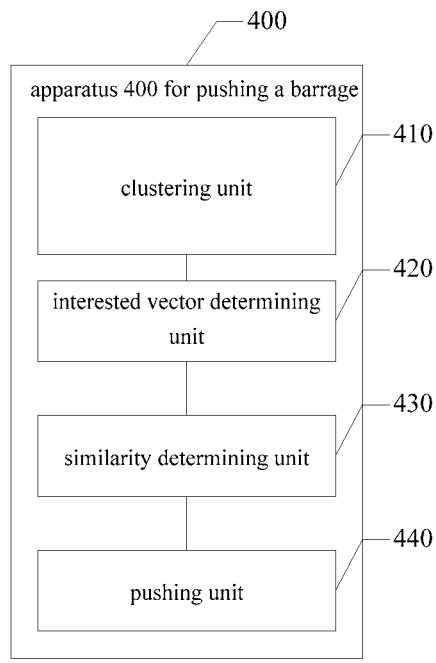
FIG. 4 shows a schematic block diagram showing a device for pushing a barrage according to some arrangements of the present disclosure.

FIG. 3 is a flowchart showing a method for pushing a barrage according to some arrangements of the present disclosure.

Referring to FIG. 3, in block S310, the barrages corresponding to the user's historical evaluation records are obtained. For example, the user's historical evaluation records can be obtained from the target database, and the corresponding barrages can be obtained based on the user's historical evaluation records.

In block S320, a vector module about the user's interested vector is created based on the barrages obtained in the block S310. For example, the obtained barrages can be segmented to obtain the word vector of each of the barrages. The word vectors of the barrages to are added and averaged to obtain the vector of the barrages, that is, the user's interested vector.

In block S330, historical barrages are obtained for a target database. The target database can be a database deployed on a server of the video playing website, which stores historical barrages information input by the user while watching the video.

In block S340, a vector module about the historical barrages obtained in the block S330 is created. For example, the obtained historical barrages can be segmented by means of word2vec to obtain a word vector of each of the historical barrages, and the word vectors of the historical barrages are added and averaged to obtain vector representation of the historical barrages.

In block S350, the historical barrages are combined to obtain the barrage to be displayed. For example, a clustering operation is performed on the historical barrages to obtain a plurality of clusters. In one of the clusters, the historical barrage close to the center vector of the cluster is used as the barrage to be displayed.

In block S360, a similarity between the user's interested vector and a vector of each of the barrages to be displayed is determined. For example, the distance between the user's interested vector and the vector of the barrage to be displayed can be calculated. The similarity between the user's interested vector and the vector of the barrage to be displayed can be determined based on the calculated distance. The distance between the user's interested vector and the vector of the barrage to be displayed may be Hamming distance, Euclidean distance, and cosine distance. However, the distance in the exemplary arrangement of the present disclosure is not limited thereto, and for example, the distance may be a Mahalanobis distance, a Manhattan distance, or the like.

In block S370, the evaluation number of the barrage to be displayed in each of the clusters, such as praise record number or comment record number, can be obtained. The evaluation number of the barrage to be displayed is multiplied by the similarity determined in the block S360, to obtain the score of the barrage to be displayed in the cluster.

In block S380, a barrage can be pushed to the user based on the score of the barrage to be displayed in the cluster determined in the 370. For example, a barrage to be displayed with highest score in the cluster can be pushed to the user.

In an exemplary arrangement shown in FIG. 3, a sum of evaluation numbers of all the historical barrages in the cluster in which the barrage to be displayed is taken as the evaluation number of the barrage to be displayed. The evaluation number of the barrage to be displayed is multiplied by the determined similarity to obtain the score of the barrage to be displayed in the cluster. The barrages to be displayed of the various clusters based on the scores of the barrages to be displayed are sorted. The barrages to be displayed of the various clusters are pushed to the user based on a sorted order.

In some exemplary arrangements of the present disclosure, there is provided a device 400 for pushing a barrage, including a clustering unit 410, an interested vector determining unit 420, a similarity determining unit 430 and a pushing unit 440. The clustering unit 410 is configured to cluster a plurality of historical barrages in a target database to obtain barrages to be displayed. The interested vector determining unit 420 is configured to determine an interested vector based on evaluation records of the historical barrages. The similarity determining unit 430 is configured to determine a similarity between a vector of each of the barrages to be displayed and the interested vector. The pushing unit 440 is configured to push the barrage to be displayed to the user based on a determined similarity.

According to some exemplary arrangements of the present disclosure, the clustering unit 410 includes a barrage obtaining unit configured to obtain the plurality of historical barrages in the target database, a barrage classifying unit configured to classify the plurality of historical barrages according to a video to which the historical barrages belong and time periods that the historical barrages being in the video, and a cluster creation unit configured to cluster the historical barrages in each of the time periods to obtain a plurality of clusters.

According to some exemplary arrangements of the present disclosure, the clustering unit 410 includes a similarity determining unit configured to determine a similarity between the historical barrages in each of the clusters and a barrage with a vector in a center point of the clusters, and a barrage to be displayed obtaining unit configured to obtain the barrage to be displayed based on the determined similarity.

According to some exemplary arrangements of the present disclosure, the barrage to be displayed obtaining unit is configured to multiply the determined the similarity of the barrage by evaluation number of corresponding historical barrages to obtain a score of the corresponding historical barrages; and obtain the barrage to be displayed based on a score of each of the corresponding historical barrages in the clusters.

According to some exemplary arrangements of the present disclosure, the obtaining the barrage to be displayed based on a score of each of the corresponding historical barrages in the clusters includes: taking a historical barrage with highest score in each of the clusters as the barrage to be displayed in the cluster.

According to some exemplary arrangements of the present disclosure, the device 400 for pushing a barrage includes an evaluation number determining unit configured to take a sum of evaluation numbers of all the historical barrages in the cluster in which the barrage to be displayed is located as the evaluation number of the barrage to be displayed.

According to some exemplary arrangements of the present disclosure, the pushing unit 440 is configured to multiply the evaluation numbers of the barrages to be displayed of the clusters by the determined similarity to obtain scores of the barrages to be displayed of the clusters; sort the barrages to be displayed of the various clusters based on the scores of the barrage to be displayed; and push the barrages to be displayed of the clusters based on a sorted order.

According to some exemplary arrangements of the present disclosure, the pushing unit 440 includes a segmenting unit configured to segment the plurality of historical barrages in the target database to obtain a word vector of each of the historical barrages; adding and averaging the word vector of each of the historical barrages to obtain a vector of each of the historical barrages.

According to some exemplary arrangements of the present disclosure, the segmenting unit is configured to use word2vec to segment the plurality of historical barrages in the target database to obtain the word vector of each of the historical barrages.

According to some exemplary arrangements of the present disclosure, the interested vector determining unit 420 is configured to add and average the word vector of each of the historical barrages to obtain an interested vector.

The respective functional modules of the device 400 for pushing a barrage provided by some exemplary arrangements of the present disclosure are corresponded to the blocks of the above-described method for pushing a barrage provided by some exemplary arrangements of the present disclosure, and thus will not be described herein.

According to some exemplary arrangements of the present disclosure, there is provided an electronic device configured to implement the above described method for pushing a barrage.

Figure 5:
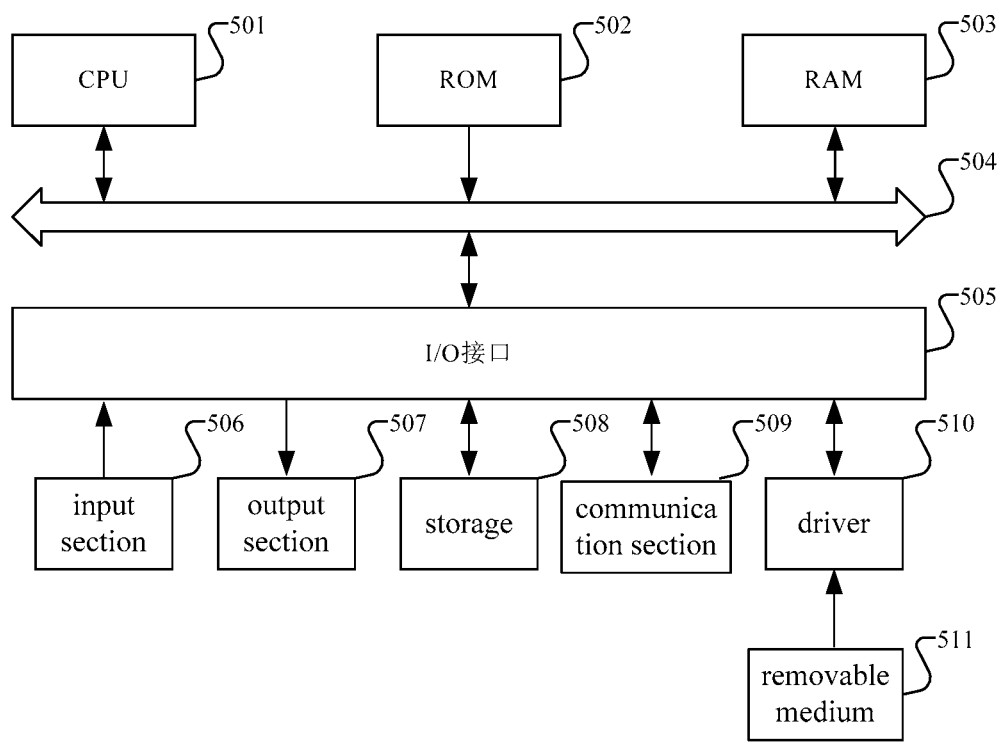
FIG. 5 shows a block diagram of a computer system suitable for implementing an electronic device according to some arrangements of the present disclosure.

Now referring to FIG. 5, a schematic structure diagram of a computer system 500 according to an arrangement of the present disclosure is shown. The electronic device shown in FIG. 5 is merely an example, and should not have any limitation on the function and the scope of use of the arrangements of the present disclosure.

As shown in FIG. 5, the computer system 500 includes one or more processors 501, which may perform various of operations according to program instructions stored in a storage (for example, the program instructions are stored in a read only memory (ROM) 502, or the program instructions are stored in a storage 508 and loaded into a random access memory (RAM) 503). In the storage 508, various programs and data required for the operation of the computer system 500 are also stored. The processor 501, the ROM 502, and the RAM 503 are connected to each another via a bus 504. Input/output (I/O) interface 505 is also connected to the bus 504.

The following components are connected to the I/O interface 505: an input section 506 including a keyboard, a mouse, and the like; an output section 507 including a cathode ray tube (CRT), a liquid crystal display (LCD), a speaker and the like; the storage 508 including a hard disk and the like; and a communication section 509 including a network interface card such as a LAN card, a modem, and the like. The communication section 509 performs communication processing via a network such as the Internet. A driver 510 is also connected to the I/O interface 505 as needed. A removable medium 511 such as a magnetic disk, an optical disk, a magneto-optical disk, a semiconductor memory and the like is mounted on the driver 510 as needed so that the computer program read therefrom can be installed into the storage 508 as needed.

According to an arrangement of the present disclosure, the process described above with reference to the flowchart may be implemented as a computer software program. For example, an arrangement of the present disclosure includes a computer program product including computer programs embodied on a computer-readable medium, the computer programs include program codes for performing the method illustrated in the flowchart. In such arrangement, the computer programs may be downloaded and installed from the network via the communication section 509, and/or installed from the removable medium 511. When the computer program is executed by the processor 501, the above-described functions defined in the system of the present disclosure are performed.

It should be noted that the computer-readable medium shown in present disclosure may be a computer-readable signal medium or a computer-readable medium or any combination thereof. The computer-readable medium may be for example but not limited to, an electronic, magnetic, optical, electromagnetic, infrared, or semiconductor system, device, or device, or any combination thereof. More specific examples of the computer-readable medium may include but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable medium may be any tangible medium that contains or stores a program that can be used by or in conjunction with an instruction execution system, device, or device. In the present disclosure, the computer-readable signal medium may include a data signal that propagates in baseband or as part of a carrier wave carrying computer-readable program code. Such propagated data signal may take a variety of forms, including but not limited to electromagnetic signals, optical signals, or any suitable combination thereof. The computer-readable signal medium may also be any computer-readable medium other than a computer-readable medium that can transmit, propagate, or transport a program for use by or in connection with an instruction execution system, device, or device. Program codes embodied on a computer readable medium may be transmitted using any suitable medium, including but not limited to wireless, wireline, optical cable, RF, etc., or any suitable combination thereof.

The flowcharts and block diagrams in the figures illustrate the architecture, functionality, and operation of possible implementations of systems, methods, and computer program products according to various arrangements of the present disclosure. In this regard, each block in the flowcharts or block diagrams may represent a part of a module, a program segment, or a code, which includes one or more executable instructions for implementing specified logic functions. It should also be noted that in some implementations as an alternative, the functions noted in the blocks may also occur in different orders than those noted in the figures. For example, two consecutively represented blocks may actually be executed substantially in parallel, and they may sometimes be executed in a reverse order, depending on the function involved. It is also to be noted that each block in the block diagram or the flowchart, and a combination of blocks in the block diagram and the flowchart, may be implemented by a dedicated hardware-based system that performs specified functions or operations, or by a combination of a dedicated hardware and computer instructions.

The component described in the arrangement of the present disclosure may be implemented through software, and may also be implemented through hardware. The described component may also be arranged in a processor. The name of the unit does not constitute a limitation on the unit itself in some cases.

An arrangement of the present disclosure also provides a computer-readable medium, which may be included in the electronic device described in the above arrangements, or may exist separately and not be incorporated into the device. The above computer readable medium carries one or more programs. When one or more of the above programs are executed by one of the electronic devices, the electronic device is caused to implement the method for pushing a barrage as described in the above arrangements.

For example, the following blocks shown in FIG. 1 may be implemented by the electronic device: in the block S110, a plurality of historical barrages in a target database are clustered to obtain barrages to be displayed; in the block S120, an interested vector is determined based on evaluation records of the historical barrages; in the block S130, a similarity between a vector of each of the barrages to be displayed and the interested vector is determined; and in the block S140, the barrage to be displayed is pushed to the user based on a determined similarity.

It should be noted that although several modules or units of device or devices for action execution are mentioned in the detailed description above, such division is not mandatory. In fact, features and functions of two or more of the modules or units described above may be embodied in one module or unit in accordance with the arrangements of the present disclosure. Conversely, the features and functions of one module or unit described above may be further divided into multiple modules or units.

Through the description of the above arrangements, those skilled in the art will readily understand that the example arrangements described herein may be implemented by software or by software in combination with necessary hardware. Therefore, the technical solution according to the arrangement of the present disclosure may be embodied in the form of a software product, which may be stored in a non-volatile storage medium (which may be a CD-ROM, a USB flash drive, a mobile hard disk, etc.) or on the network, a number of instructions are included to cause a computing device (which may be a personal computer, server, touch terminal, or network device, etc.) to perform a method in accordance with an arrangement of the present disclosure.

Other arrangements of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for displaying a barrage, comprising:
   clustering a plurality of historical barrages in a target database to obtain a plurality of clusters, which comprises obtaining the plurality of historical barrages in the target database, classifying the plurality of historical barrages according to a video to which the plurality of historical barrages belong and a plurality of time periods that the plurality of historical barrages are respectively located in the video, and clustering classified historical barrages in each of the time periods to obtain a respective cluster of the plurality of clusters, wherein the classified historical barrages in each of the time periods are clustered by a K-means clustering operation or a K-neutral point clustering operation to reduce the barrages with a same or similar content in a same time period;
   for each of the plurality of clusters, calculating distance between each of the historical barrages of the cluster and a barrage with a vector in a center point of the cluster, determining a similarity between each of the historical barrages of the cluster and the barrage with the vector in the center point of the cluster based on calculated distance, to obtain a barrage to be displayed based on determined similarity;
   determining an interested vector based on an evaluation record of historical barrages input by a current user;
   determining a first similarity between a vector of the barrage to be displayed and the interested vector of the current user; and
   pushing the barrage to be displayed to the current user based on the first similarity,
   wherein classifying the plurality of historical barrages according to the video to which the plurality of historical barrages belong and the plurality of time periods that the plurality of historical barrages are respectively located in the video, comprises:
   dividing the video into the plurality of time periods; and
   putting historical barrages input in a same time period into a same group,
   wherein clustering the classified historical barrages in each of the time periods to obtain the respective cluster of the plurality of clusters, comprises:
   clustering the historical barrages input in the same group to obtain the respective cluster.

2. The method for displaying a barrage according to claim 1, wherein obtaining the barrage to be displayed based on the determined similarity comprises:
   multiplying the determined similarity by evaluation numbers of corresponding historical barrages to obtain a score of each of the corresponding historical barrages; and
   obtaining the barrage to be displayed based on the score of each of the corresponding historical barrages in the plurality of clusters.

3. The method for displaying a barrage according to claim 2, wherein obtaining the barrage to be displayed based on the score of each of the corresponding historical barrages in the plurality of clusters comprises:
   taking a historical barrage with a highest score in each of the plurality of clusters as the barrage to be displayed in a first cluster of the plurality of clusters.

4. The method for displaying a barrage according to claim 3, further comprising: taking a sum of evaluation numbers of the plurality of historical barrages in the first cluster in which the barrage to be displayed is located as the evaluation number of the barrage to be displayed.

5. The method for displaying a barrage according to claim 4, wherein pushing the barrage to be displayed to the current user based on the first similarity comprises:
   multiplying the evaluation number of the barrage to be displayed of the first cluster by the first similarity to obtain a score of the barrage to be displayed of the first cluster;
   sorting the barrage to be displayed based on the score of the barrage to be displayed; and
   pushing the barrage to be displayed based on a sorted order.

6. The method for displaying a barrage according to claim 1, further comprising:
   segmenting the plurality of historical barrages in the target database to obtain a word vector of each of the plurality of historical barrages; and
   adding and averaging the word vector of each of the plurality of historical barrages to obtain a vector of each of the plurality of historical barrages.

7. The method for displaying a barrage according to claim 2, further comprising:
   segmenting the plurality of historical barrages in the target database to obtain a word vector of each of the plurality of historical barrages; and
   adding and averaging the word vector of each of the plurality of historical barrages to obtain a vector of each of the plurality of historical barrages.

8. The method for displaying a barrage according to claim 3, further comprising:
   segmenting the plurality of historical barrages in the target database to obtain a word vector of each of the plurality of historical barrages; and
   adding and averaging the word vector of each of the historical barrages to obtain a vector of each of the plurality of historical barrages.

9. The method for displaying a barrage according to claim 4, further comprising:
 segmenting the plurality of historical barrages in the target database to obtain a word vector of each of the plurality of historical barrages; and
 adding and averaging the word vector of each of the plurality of historical barrages to obtain a vector of each of the plurality of historical barrages.

10. The method for displaying a barrage according to claim 5, further comprising:
 segmenting the plurality of historical barrages in the target database to obtain a word vector of each of the plurality of historical barrages; and
 adding and averaging the word vector of each of the plurality of historical barrages to obtain a vector of each of the plurality of historical barrages.

11. The method for displaying a barrage according to claim 6, wherein segmenting the plurality of historical barrages in the target database to obtain the word vector of each of the historical barrages comprises:
 using word2vec to segment the plurality of historical barrages in the target database to obtain the word vector of each of the plurality of historical barrages.

12. The method for displaying a barrage according to claim 6, wherein determining the interested vector based on the evaluation record of the historical barrages input by the current user comprises:
 adding and averaging the word vector of each of the historical barrages to obtain the interested vector.

13. A device for displaying a barrage, comprising:
 a clustering unit configured to cluster a plurality of historical barrages in a target database to obtain a plurality of clusters, which comprises obtaining the plurality of historical barrages in the target database, classifying the plurality of historical barrages according to a video to which the plurality of historical barrages belong and a plurality of time periods that the plurality of historical barrages are respectively located in the video, and clustering classified historical barrages in each of the time periods to obtain a respective cluster of the plurality of clusters, wherein the classified historical barrages in each of the time periods are clustered by a K-means clustering operation or a K-neutral point clustering operation to reduce the barrages with a same or similar content in a same time period; and for each of the plurality of clusters, calculate distance between each of the historical barrages of the cluster and a barrage with a vector in a center point of the cluster, determine a similarity between each of the historical barrages of the cluster and the barrage with the vector in the center point of the cluster based on calculated distance, to obtain a barrage to be displayed;
 an interested vector determining unit configured to determine an interested vector based on an evaluation record of historical barrages input by a current user;
 a similarity determining unit configured to determine a first similarity between a vector of the barrage to be displayed and the interested vector of the current user; and
 a pushing unit configured to push the barrage to be displayed to the current user based on the first similarity,
 wherein classifying the plurality of historical barrages according to the video to which the plurality of historical barrages belong and the plurality of time periods that the plurality of historical barrages are respectively located in the video, comprises:
 dividing the video into the plurality of time periods; and
 putting historical barrages input in a same time period into a same group,
 wherein clustering the classified historical barrages in each of the time periods to obtain the respective cluster of the plurality of clusters, comprises:
 clustering the historical barrages input in the same group to obtain the respective cluster.

14. An electronic device, including a processor, and a memory storing computer readable instructions, wherein the computer readable instructions are executed by the processor to implement the method for displaying a barrage according to claim 1.

* * * * *